United States Patent [19]

Nakada et al.

[11] Patent Number: 5,053,278

[45] Date of Patent: Oct. 1, 1991

[54] CARBONACEOUS GRANULAR HEAT INSULATOR AND PROCESS FOR PREPARING THE SAME

[75] Inventors: Toshio Nakada; Fumio Takemura; Masao Ishiwata, all of Gotenba, Japan

[73] Assignee: Tokai Carbon Co., Ltd., Tokyo, Japan

[21] Appl. No.: 348,924

[22] Filed: May 8, 1989

[30] Foreign Application Priority Data

Jan. 30, 1987 [JP] Japan .................................. 62-18165
Feb. 27, 1987 [JP] Japan .................................. 62-42721
Jul. 6, 1987 [JP] Japan .................................. 62-167003

[51] Int. Cl.$^5$ ............................ B32B 9/00; C09C 1/56
[52] U.S. Cl. .................... 428/403; 264/29.3; 264/29.5; 427/215; 427/228; 428/404; 428/407; 428/408
[58] Field of Search .............. 428/403, 404, 407, 408, 428/325; 501/99; 427/215, 228; 264/29.3, 29.5

[56] References Cited

U.S. PATENT DOCUMENTS

| | | | |
|---|---|---|---|
| 2,719,779 | 11/1955 | Bray et al. ........................ | 264/29.3 |
| 2,962,386 | 11/1960 | Doll et al. ........................ | 117/46 |
| 3,167,447 | 1/1965 | Tully et al. ........................ | 117/46 |
| 3,900,547 | 8/1975 | Hunt et al. ........................ | 264/117 |
| 3,927,187 | 12/1975 | Luhleich et al. .................... | 423/448 |
| 4,009,143 | 2/1977 | Luhleich et al. ................ | 428/524 X |
| 4,076,892 | 2/1978 | Fennimore et al. ................. | 428/407 |
| 4,221,689 | 9/1980 | Dias et al. ........................ | 524/596 X |
| 4,289,743 | 9/1981 | Ruble ................................ | 423/450 |
| 4,366,191 | 12/1982 | Gistinger et al. ................... | 427/228 |
| 4,774,147 | 9/1988 | Kuse et al. ......................... | 428/323 |

*Primary Examiner*—George F. Lewis
*Assistant Examiner*—Christopher Brown
*Attorney, Agent, or Firm*—Armstrong, Nikaido, Marmelstein, Kubovcik & Murray

[57] ABSTRACT

A granular carbonaceous heat insulator comprising a carbon black pellet the surface of which is coated with a carbon layer having a dense structure is disclosed. This heat insulator is prepared by adhering a binder solution to a carbon black pellet, heating the resulting coating to remove a solvent from the binder solution and, at the same time, to cure the binder, and baking the carbon black pellet coated with the cured binder in a non-oxidizing atmosphere to carbonize the cured binder. Alternatively, the heat insulator is prepared by subjecting a carbon black pellet having specific characteristics to wet granulation in the presence of a binder solution to crush the carbon black pellet and, at the same time, to granulate the crushed pellet, thereby preparing a granulated carbon black pellet, followed by removal of the solvent from the prepared pellet, curing of the binder and baking of the cured binder in the same manner as that described above.

2 Claims, 2 Drawing Sheets

CARBONACEOUS GRANULAR HEAT INSULATOR AND PROCESS FOR PREPARING THE SAME

This is a division of application Ser. No. 133,989 filed Dec. 17, 1987, now U.S. Pat. No. 4,888,215.

BACKGROUND OF THE INVENTION

This invention relates to a carbonaceous granular heat insulator for use in a high-temperature oven in a non-oxidizing atmosphere and a process for preparing the same.

A carbon material is excellent in a high-temperature stability and a chemical stability in a non-oxidizing atmosphere and, therefore, is used as a refractory material and a heat insulator in a high-temperature oven.

In general, an insulating performance required of an insulating material, i.e., thermal conductivity, greatly varies depending on the porosity of the insulating material. As the porosity increases, the thermal conductivity decreases while the insulating performance is improved.

Examples of the carbonaceous heat insulator which has been put to practical use include a porous carbonaceous material prepared by carbonizing a foamed resin through baking or a bulky carbon molding prepared by impregnating a felt made of a carbon fiber with a thermosetting resin, molding the impregnated felt, curing the resulting molding and carbonizing the cured molding through baking. All of these carbonaceous heat insulators are foamed carbon material and, therefore, take advantage of an insulating function of large voids present therein.

However, the raw materials of these foamed carbon materials are disadvantageous in that the applications thereof are limited because the cost in high due to expensive raw materials used and complicated steps of production.

Carbon black comprises an aggregate having a chain structure formed by fusion and secondary aggregation of very fine spherical fundamental particles having a diameter of 10 to 200 nm, and many voids are present among the aggregate.

Although the surface layer and its vicinity of the fundamental particle comprise a carbon hexagonal network, the fundamental particle comprises amorphous carbon on the whole. The carbon black itself, therefore, has an excellent insulating property and is advantageously inexpensive, which makes it possible to put the carbon black into practical use, e.g., as an insulating filler of a high-temperature oven.

However, since the carbon black is a finely divided powder comprising an aggregate of fine fundamental particles, it tends to scatter during charging of an oven therewith and discharging it from the oven, which brings about environmental pollution. Further, it is poor in fluidity, which makes it very difficult to handle In general, carbon black to be compounded with rubber is granulated for the purpose of controlling the environmental pollution and improving the fluidity. However, pellets prepared by granulation are fragile and do not have a pellet hardness sufficient to prevent the occurrence of attrition loss and breakage of the granules. Further, the pellets tend to break into finely divided powder, which raises problems such as scattering of the powder and lowering in fluidity.

SUMMARY OF THE INVENTION

The present invention has been made with a view to eliminating the drawbacks accompanying the above-mentioned prior art. A first object of the present invention is to provide a carbonaceous granular heat insulator which has high pellet hardness and excellent fluidity and handleability while maintaining an excellent insulating performance inherent in carbon black. A second object of the present invention is to provide a process for efficiently preparing a carbonaceous granular heat insulator of the kind as mentioned above.

DETAILED DESCRIPTION OF THE PREFERRED EMBODIMENTS

Figure 1:
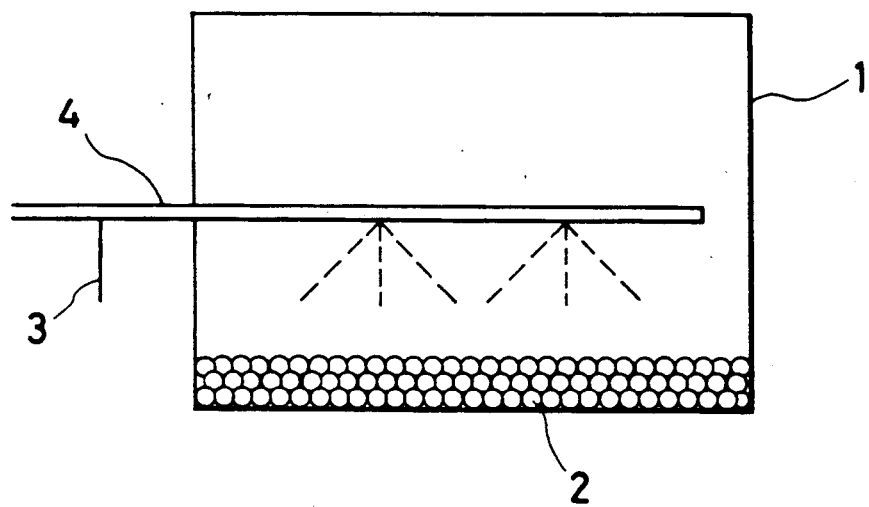
FIG. 1 is a schematic vertical sectional view of a rotating cylindrical container for use in the first process for preparing a carbonaceous granular heat insulator according to the present invention.

The carbonaceous granular heat insulator according to the present invention comprises a carbon black pellet or a secondary granulation granule of the pellet having a surface coated with a carbon layer having a dense structure. The diameter of the carbonaceous granular heat insulator is usually 0.1 to 2 0 mm.

Examples of the carbon black of the present invention include various kinds of carbon black, such as oil furnace black, gas furnace black, channel black, thermal black, acetylene black, lamp black, and by-product black. The carbon black pellet is produced by granulation of the above-mentioned carbon black. Known granulation methods ordinarily used in the art can be applied to the granulation of the carbon black. For example, in a wet granulation method, a pellet is produced by placing carbon black in a pin type pelletizer, adding a suitable amount of water while agitating through rotation of a shaft, thereby granulating the carbon black, and drying the granule.

On the other hand, in a drying method, a pellet is produced by placing carbon black in a cylindrical kiln which is slowly rotated with a slight inclination and conducting tumbling granulation.

In an early stage of the production of a pellet, finely divided carbon black first forms nuclei for formation of a pellet through gathering of a number of aggregates having a chain structure, and the nuclei combine and grow into a pellet. The diameter of the carbon black pellet is usually 0.1 to 2 0 mm.

As will be described later with respect to the second process for preparing a carbonaceous granular heat insulator, the carbon black pellet can be also produced by a wet granulation method which comprises crushing followed by granulation of a carbon black pellet in the presence of a binder solution. The diameter of the carbon black pellet thus obtained is generally 0.1 to 2.0 mm.

In the present invention, a carbon layer having a dense structure formed on the surface portion of the carbon black pellet comprises a carbon material having a very dense and uniform structure. This dense carbon layer is present together with carbon black in an intermediate layer of the carbonaceous granular heat insulator of the present invention. Further, the surface portion of the carbonaceous granular heat insulator is wholly coated with this dense carbon layer. Consequently, the carbonaceous granular heat insulator of the present invention has a pellet hardness of 100 g/pellet or more, i.e., exhibits a greatly improved pellet hardness over that of the carbon black pellet.

The process for preparing the above-mentioned carbonaceous granular heat insulator according to the present invention will now be described.

According to the present invention, the carbonaceous granular heat insulator can be produced by either of the two following methods.

A. First Process

The first process comprises coating the surface of a carbon black pellet with a carbon layer having a dense structure and is divided into the following steps 1, 2, and 3.

Step 1: A binder solution is adhered to the surface of a previously prepared carbon black pellet. The adhesion is conducted by an impregnation method, preferably a spray method. The impregnation method comprises packing a column with a carbon black pellet and flowing a binder solution through the column or immersing a carbon black pellet in a binder solution.

The spray method comprises atomizing a binder solution while tumbling a previously granulated carbon black pellet to wet the surface of the carbon black pellet with the solution. For example, as shown in FIG. 1, this method can be conducted by spraying through an ejection pipe 4 a binder solution entrained with an atomized gas introduced from a side pipe 3 on a carbon black pellet 2 tumbling within a rotating cylindrical container 1.

This treatment is advantageous in that the surface of a carbon black pellet is very uniformly wetted with a binder solution. Examples of the binder used in the step 1 include a thermosetting resin, such as phenolic resin, furan resin, and polyimide resin, and a carbonizable substance, such as tar and pitch. These binders exhibit a high coking value in baking, which leads to a reduction in the amount of the evolution of a decomposition gas, thus rendering these binders suitable for the formation of a uniform carbon layer having a dense structure on the surface portion of the carbon black pellet.

The solvent used for formation of the binder solution may be any solvent as far as it is easily volatilized and can dissolve the binder, and examples of the solvent include organic solvents, e.g. aliphatic alcohols such as methyl alcohol and ethyl alcohol, aliphatic ethers such as methyl ether and ethyl ether, aliphatic ketones such as acetone, aromatic hydrocarbons such as benzene, toluene and xylene, and alicyclic hydrocarbons such as cyclohexane. Further, an emulsion prepared by suspending a binder in a suitable medium can be also used as the binder solution. When an organic solvent solution of a thermosetting resin is used as the binder solution, the concentration of the thermosetting resin varies depending upon the kind of the resin an the kind of the organic solvent and is usually 3 to 70%, preferably 5 to 40%.

Step 2 In the step 2, the carbon black pellet having a surface coated with the binder solution obtained in the step 1 is heated to volatilize and remove the organic solvent, thereby curing the binder.

The heating treatment is conducted at a temperature corresponding to the boiling point or above, preferably at a lowest possible temperature and a lowest possible rate. For example, the heat treatment is conducted at about 100° C. for 1 hr or longer. Further, a heat treatment under reduced pressure enables the removal of the organic solvent through the volatilization at a lower temperature and a lower rate. Thus, the organic solvent is volatilized and removed and, at the same time, the binder is cured on the surface portion of the carbon black pellet, thereby obtaining a carbon black pellet having a surface portion coated with a cured binder.

A part of the binder solution adhered to the carbon black pellet penetrates the pellet. The heating of the pellet causes the solvent in the penetrating binder solution to migrate to the surface portion of the pellet and to volatilize therefrom. The binder also migrates to the surface portion accompanying the migration of the solvent. Therefore, the amount of the binder remaining within the pellet is reduced, The conditions for curing the binder vary depending upon the kind of the binder. For example, the curing is conducted by maintaining the binder at a temperature of 300° C. or below for about 2 hr. The surface portion of the carbon black pellet coated with the cured binder can be further reinforced by adhering the same binder solution again to the surface of the carbon black pellet coated with the cured binder and again curing the binder. This treatment with the binder solution is conducted by adhering a solution prepared by dissolving a binder in a solvent to the surface of the granule by suitable means, such as coating or spraying. In this case, since the surface portion of the pellet already has a dense structure of the cured binder, the surface of the pellet can be uniformly coated with the binder solution without causing the penetration of the binder solution into the inside of the pellet structure. With respect to the removal of the solvent in the re-adhered binder solution and curing of the binder through the heating thereof, there is no need for gradual removal and volatilization of the solvent because the carbon black pellet is already coated with the cured binder. For example, the removal of the solvent and the curing of the re-adhered binder can be simultaneously conducted by maintaining the coating at a temperature of 300° C. or below for 2 hr. The carbon black pellet having a surface portion coated with a cured binder obtained in the step 2 is baked in the subsequent step 3 which will be described later to prepare a carbon black pellet coated with carbon having a dense structure. It is preferred that the carbon black pellet coated with carbon having a dense structure obtained in the step 3 be a spherical granule having a diameter of 0.1 to 2.0 mm and such a granule diameter distribution that 90% or more of the granules have diameters falling within this range.

When the carbon black coated with carbon having a dense structure meets the above-mentioned requirements, not only smooth handling in the packing and discharging operations etc. can be attained but also a uniform packing layer free from uneven packing can be obtained. In order to prepare such favorable carbon black coated with a carbon layer having a dense structure, the following conditions should be adopted in the step 2.

Specifically, the carbon black pellet to which the binder solution obtained in the step 1 has been adhered is heated at a temperature elevation rate of 20° C./min or less .o a temperature region of 200° C. or below while tumbling it in an inert gas stream, and the carbon pellet is then maintained at that temperature for 30 min or longer to cure the binder present on the surface portion thereof. More specifically, an apparatus, such as a rotary kiln, is charged with the carbon black pellet having a surface to which the binder solution has been adhered, and the carbon black pellet is tumbled in a system filled with an inert gas, such as nitrogen or argon.

In this step, the binder which has penetrated into the inside of the carbon black pellet migrates to the surface portion of the pellet accompanying the volatilization of the solvent and, at the same time, the binder is cured by the repeated tumbling of the pellet. This leads to not only the formation of carbon black pellets coated with a binder, graded to have granule sizes excellent uniformity and formed into a true spherical shape but also an increase in the gloss of the surface thereof.

In this operation, it is important that the binder be gradually cured. For example, the binder is heated at a temperature elevation rate of 20° C. or less to a temperature region of 200° C. or below, preferably 100° to 200° C. and maintained at that temperature. When the treatment is conducted at a temperature elevation rate exceeding 20° C./min and a heating temperature exceeding 200° C., a rapid dehydrocondensation reaction or a rapid heat shrinkage occurs in the binder, which brings about the occurrence of cracking on the binder layer formed on the surface of the pellet.

The binder of the surface portion is fully cured by maintaining the binder under the above-mentioned heating conditions for 30 min or longer.

Step 3: In this step, the carbon black pellet coated with the cured binder obtained in the step 2 is baked in a non-oxidizing gas stream at a temperature of 1000° to 2000° C., preferably 1500° to 2000° C. to convert the cured binder layer present on the surface of the pellet into a glassy carbon layer.

The baking time is usually 0.5 to 2.0 hr. Consequently, there is formed a granule having a surface portion coated with a carbon layer having a dense structure and an intermediate layer in which carbon black is present together with the carbon layer having a dense structure.

B. Second Process

The second process is divided into the following steps (a), (b), and (c).

Step (a): In this step, a carbon black pellet is put into a wet granulator, and a predetermined amount of a binder solution is added to the carbon black pellet while stirring for granulation. The carbon black pellet is crushed and, at the same time, granulated with the binder solution to form a spherical pellet. In this case, the raw carbon black pellet is hardly crushed into an aggregate having a chain structure but crushed into a nuclear granule or an assembly thereof and then grows into a spherical pellet. Therefore, the binder solution is merely present on the surface of the nuclear granule or its assembly without penetration into the inside of the voids of the aggregate having a chain structure. Consequently, in a granular material having a surface portion coated with a carbon layer having a dense structure prepared by heating the pellet to remove the solvent component and then subjecting the pellet to the curing and carbonization treatment, the void portions of the aggregate having a chain structure remain substantially as they are, which contributes to the prevention of the lowering in the insulating performance inherent in the carbon black.

Further, the carbon layer having a dense structure with which the surface of the pellet has been coated contributes to a remarkable increase in the pellet hardness. When finely divided carbon black is directly granulated with a binder solution, the binder solution penetrates into the inside of the aggregate having a chain structure of carbon black, and a carbide is formed in such a state that the binder solution remains as it is in the inside of the aggregate even in the step of curing and carbonization by baking which brings about a remarkable lowering in the insulating performance.

The insulating performance of the carbon black is closely related to the fundamental particle characteristics. In order to maintain an excellent insulating performance, it is preferable to meet the following requirements presence of a number of internal voids derived from a large size of aggregate having a chain structure; less tendency of the binder solution to penetrate into the internal voids of the aggregate having a chain structure; and formation of a relatively large nuclear granule for granulation and a relatively small amount of a binder solution required for the growth of secondary granulation granules. In other words, it is preferred that the carbon black have a high structure and a high specific surface area as fundamental particle characteristics.

In view of the above-mentioned matter, a carbon black pellet having the following characteristics is used in the step (a):

a DBP absorption number of compressed sample of 80 ml/100 g or more;

a nitrogen adsorption specific surface area of 35 $m^2/g$ or more; and a true specific gravity-related value ($\Delta d$) of 0.150 as defined by the following equation: $\Delta d = d_2 - d_1$, wherein $d_2$ and $d_1$ are true specific gravity values of carbon black after heat treatments at 650° C. and 2600° C., respectively.

When the DBP absorption number of compressed sample is 80 ml/100 g or more, not only the size of the aggregate having a chain structure is relatively increased and the number of internal voids is also increased but also the nuclear granules for granulation can be easily formed, which enables the growth of secondary nuclear granules for granulation with only a small amount of the binder solution. As mentioned above, the nitrogen adsorption specific surface area is set at 35 $m^2/g$ or more because the diameter of fundamental particle of the carbon black is small, which makes it difficult for the binder solution to penetrate the nuclear granule for granulation, thus leading to the suppression of the lowering in the number of voids in the secondary granulation granule.

The true specific gravity-related value ($\Delta d$) is closely related to the internal structure of the fundamental particle of the carbon black. Specifically, $\Delta d$ corresponds to the degree of carbonization (graphite-like carbon hexagonal network structure) in the step of forming the carbon black. When the carbon black is small in the diameter of the fundamental particles thereof and relatively large in the specific surface area and the DBP absorption number of compressed sample, the value of $\Delta d$ is small. This phenomenon is thought to be due to the fact that, when the carbon black is heat treated, the amorphous carbon structure in the inside of the fundamental particle of the carbon black hardly causes re-orientation in the inside of the granule but is converted into a complicated, graphitized form, which brings about a hollow or sponge-like porous structure. When Δd is 0.150 or less, formation of the porous structure in the inside of the fundamental aggregate is advanced, which contributes to an improvement in the insulating performance.

The DBP absorption number of compressed sample, nitrogen adsorption specific surface area, and true specific gravity-related value (Δd) were determined by the following methods.

DBP absorption number of compressed sample: ASTM D3493-79 "Carbon Black-Dibutyl Phthalate Absorption Number of Compressed Sample".

Nitrogen adsorption specific surface area: ASTM D3037-78 "Standard Methods of Testing Carbon Black Surface Area by Nitrogen Adsorption" Method B.

True specific gravity-related value (Δd): A carbon black sample was put into a crucible equipped with an insert form cover and subjected to a deaeration treatment at a temperature of 650 ± 25° C., followed by determination of a true specific gravity according to method B as described in "Kogyo Kagaku Zasshi", Vol. 66, No. 12, 1758 (1963). The value thus obtained is expressed in $d_1$. Separately, the true specific gravity of the carbon black is determined in the same manner as that mentioned above, except that the heat treatment is conducted at 2600 ± 50° C. The true specific gravity-related value (Δd) is calculated by the following equation: $\Delta d = d_2 - d_1$.

The binder solution used in the step (a) is the same as that used in the above-mentioned first process.

Step (b): In this step, the secondary granulation granule which has been prepared in the step (a) is heat treated at a temperature of 300° C. or below in the air to remove the solvent in the binder solution and, at the same time, to cure the binder.

In this case, when the granule is cured in the same manner as that in the step 2 of the above-mentioned first process, i.e., by placing the granule in a rotary drum and heating the granule while tumbling it by rotation of the drum, sphering is accelerated to form a granule having a substantially true spherical shape. This prevents the breakage of the granule, thus leading to an advantage with respect to the handling. When the granule is further heated to a temperature of about 500° C., a component which is difficult to carbonize can be removed.

Step (c): This step is the same as the step 3 of the first process. Specifically, the granule is heated in a non-oxidizing atmosphere at 1000° to 2000° C., preferably 1500° to 2000° C. to carbonize the carbonizable component by baking, thereby preparing a carbonaceous granule coated with a hard carbon layer having a dense structure.

As described above, the carbonaceous granular heat insulator according to the present invention has a carbon layer having a dense structure formed and adhered on the surface thereof. That is, the carbonaceous granular heat insulator according to the present invention has a very hard and smooth surface structure while maintaining a thermal conductivity inherent in the carbon black, i.e., an advanced insulating performance. Therefore, the carbonaceous granular heat insulator according to the present invention not only is free from attrition loss and breakage of the granule even during the picking and discharging operations but also exhibits excellent tumbling fluidity, which makes it possible to widely use the granular heat insulator according to the present invention as a granular heat insulator having excellent workability in the field of various high-temperature industries.

In the first process for preparing a carbonaceous granular heat insulator according to the present invention, a carbonaceous granular heat insulator can be easily produced by adhering a binder solution to the surface of a granulated carbon black pellet, heating the resulting coating to remove the solvent and, at the same time, to cure the binder, and then baking the cured binder in a non-oxidizing gas stream.

Particularly, granules having a suitable range of granule size distribution and a smooth, spherical, hard surface structure can be always prepared through a synergistic function of the combination of the uniform wetting of the surface of a carbon black pellet with a binder solution in the step 1, grading for attaining a uniform granule size and formation of a true sphere in the step 2, and the formation of a carbon layer having a dense structure through carbonization of the binder in the step 3, which makes it possible to mass-produce a high-performance carbonaceous granular heat insulator having a combination of remarkably improved handleability and packability with an insulating performance inherent in the carbon black as the base material.

Further, the second process for preparing a carbonaceous granular heat insulator according to the present invention enables the production of a granular heat insulator having very high pellet hardness with high efficiency through the use of a carbon black pellet having the following characteristics, which renders the process very suitable for use in mass-production of a granular heat insulator having excellent workability:

a DBP absorption number of compressed sample of 80 ml/100 g or more;

a nitrogen adsorption specific surface area of 35 m²/100 g or more; and a true specific gravity-related value (Δd) of 0.150 as defined by the following equation: $\Delta d = d_2 - d_1$, wherein $d_2$ and $d_1$ are true specific gravity values of carbon black after heat treatments at 650° C. and 2600° C., respectively.

The present invention will now be described in more detail with reference to the following examples.

EXAMPLE 1

Various carbon black pellets produced according to the wet granulation method were each sieved to collect pellets having a diameter ranging from 0.5 to 2.0 mm. Columns each having a diameter of 700 mm and a height of 500 mm were packed with 200 g of the carbon black pellets. A furan resin (Hitafran VF303; a product of Hitachi Chemical Co., Ltd ) was used as a binder. The binder was dissolved in acetone to prepare a solution having a binder concentration of 2.5% by weight. The solution was injected into the column to spray the solution on the carbon black pellet, thereby impregnating the carbon black pellet with the solution. Separately, 200 g of a carbon black pellet was placed in a rotating cylindrical tube (a diameter of 150 mm and length of 300 mm), and the solution was sprayed on the carbon black pellet while rotating the tube at 50 rpm, thereby impregnating the carbon black pellet with the solution. These pellets impregnated with the solution were heated in the air at 100° C. for 1 hr to volatilize and remove acetone and, at the same time, to cure the furan resin.

Then, acetone solutions of a furan resin having various furan resin concentrations were sprayed again on the surface of the cured carbon black pellet. The re-treated granule was heat cured in the air at 200° C. for 1 hr and then baked and carbonized in a nitrogen gas atmosphere at 1500° C. for 30 min. The strength characteristics and heat conductivity of the granular carbonaceous heat insulator thus obtained were determined by the following methods.

(1) Pellet hardness: A sample having a granule diameter of 1 mm was put on a balance. Loads were applied to the sample from above with a piston to measure a load required for breaking the granule. An average value of the data obtained with respect to 50 sample was then determined.

(2) Attrition: 25 g of a sample was put on a sieve having a 125 μm mesh size. The sieve was then shaken for 5 min to remove granules which have passed through the sieve. Then, the sieve was further shaken for 15 min to determine the percentage by weight of the sample which has passed through the sieve having a 125 μm mesh size (according to ASTM D4324-'84).

(3) Heat conductivity: A sample to be determined was packed in the central portion (a diameter of 200 mm and a length of 200 mm) of a small tubular oven (an inner diameter of 200 mm and a length of 500 mm) equipped with a silicon carbide electrical heating element at the central portion thereof. A heat insulator (a diameter of 200 mm and a length of 150 mm) was packed into both sides of the sample. An electric current was passed through the electrical heating element. The power consumption and the temperatures of the sample respectively at positions of 40 mm and 80 mm away from the electrical heating element were determined in a steady state. The thermal conductivity was calculated from the data thus obtained by making use of Fourier's equation.

The results are shown in Table 1. For comparison, the characteristics of carbon black pellets themselves used in Run No 1 and Run No. 3, which have not been applied to the treatment for adhering a carbon layer having a dense structure, are also shown in Table 1 (see Run No. 6 and Run No. 7).

EXAMPLE 2

A carbonaceous granular heat insulator was prepared under the same conditions as those adopted with respect to the carbon black of Run No. 1 in Example 1, except that the heating and curing treatment at 200° C. for 1 hr was conducted with a rotary drum (a diameter of 275 mm, a length of 1300 mm and a number of revolutions of 30 rpm). The carbonaceous granular heat insulator thus obtained exhibited a pellet hardness of 291 g/pellet, an attrition of $4 \times 10^{-2}$% by weight, and a thermal conductivity of 0.405 Kcal/m.hr.° C. (at 1200° C.) and 0.442 Kcal/m.hr.° C. (at 1500° C.).

EXAMPLE 3

1000 g of a furnace carbon black pellet having a nitrogen adsorption specific surface area of 57 m$^2$/g and a DBP absorption number of compressed sample of 98 ml/100 g was put into a rotating cylindrical container (a diameter of 400 mm and a length of 400 mm) equipped with an atomizing spray nozzle as shown in FIG. 1. The container was rotated at 40 rpm. In this state, 1000 ml of a solution (a concentration of 25% by weight) prepared by dissolving a phenolic resin precondensate (PR50001E; a product of Sumitomo Durez Co., Ltd.) in ethanol was sprayed by entrainment with a nitrogen gas from the spray nozzle (step 1). After the completion of the spraying, the wet carbon black was tumbled for a while, transferred to an external heating rotary kiln (a diameter of 275 mm and a length of 1300 mm) and subjected to curing treatment under varied conditions with respect to the temperature elevation rate, treating temperature, retention time, etc. (step 2). After the completion of the curing treatment, the carbon black pellet was transferred to a baking oven, where it was heat treated in a nitrogen stream at 1500° C. for 1.0 hr to carbonize the resin component (step 3).

The carbonaceous granular heat insulator thus obtained was subjected to the determination of a granule size distribution, a pellet hardness, a thermal conductivity, etc. The results are shown in Table 2 together with the treatment conditions.

TABLE 1

| Item | Application Run No. | Example 1 | 2 | 3 | 4 | 5 | Comparative Example 6 | 7 |
|---|---|---|---|---|---|---|---|---|
| (1) Characteristics of carbon black pellet sample: | | | | | | | | |
| Nitrogen adsorption specific surface area, N$_2$SA (m$^2$/g) | | 58 | 58 | 99 | 79 | 58 | 58 | 99 |
| DBP absorption number of compressed sample (ml/100 g) | | 168 | 168 | 129 | 102 | 168 | 168 | 129 |
| (2) Impregnation conditions of resin solution: | | | | | | | | |
| Impregnation method | | Column | Column | Column | Column | Rotating cylinder | — | — |
| Amount of impregnation (g) | | 400 | 400 | 320 | 280 | 400 | — | — |
| (3) Re-treating conditions of resin solution | | | | | | | | |
| Solution concentration (wt %) | | 10 | 5 | 13 | 15 | 10 | — | — |
| Amount of spraying (g) | | 400 | 400 | 320 | 280 | 400 | — | — |
| (4) Characteristics of granular carbonaceous heat insulator | | | | | | | | |
| Pellet hardness (g/pellet) | | 269 | 126 | 313 | 433 | 301 | 8.5 | 8.0 |
| Attrition ($\times 10^{-2}$ wt %) | | 6 | 13 | 5 | 3 | 6 | 357 | 400 |
| Thermal conductivity (Kcal/m · hr. °C.) | | | | | | | | |
| at 1200° C. | | 0.418 | 0.389 | 0.455 | 0.547 | 0.448 | 0.335 | 0.392 |
| at 1500° C. | | 0.459 | 0.444 | 0.496 | 0.579 | 0.488 | 0.387 | 0.437 |

In this example, the granule size distribution was determined according to JIS K6221-82, and the pellet hardness, attrition, and thermal conductivity were determined in the same manner as that of Example 1.

In Table 2, the granule size distribution of carbon black used as the base material is shown in the column of "Base material" in the row of "Run No."

As can be seen from Table 2, all of Run Nos. 8 to 13 (examples of the present invention) meeting the preferred requirements for the treating conditions in the first process according to the present invention exhibit such a granule size distribution that 90% or more of the granules have a suitable diameter ranging from 0.5 to 2 mm and also exhibit improved granule grading over comparative examples which do not meet the requirements for the base material and the treating conditions. Further, it is apparent that the examples of the present invention are also superior in characteristics, such as pellet hardness and thermal conductivity, to the comparative examples.

Figure 2:
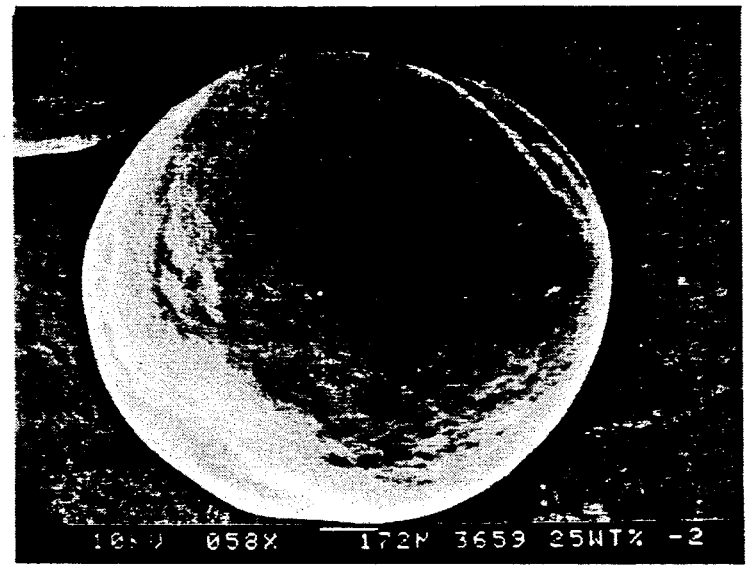
FIG. 2 is a photomicrograph of a carbonaceous granular heat insulator prepared in Run No. 9 for Example 3 according to the present invention.
Figure 3:
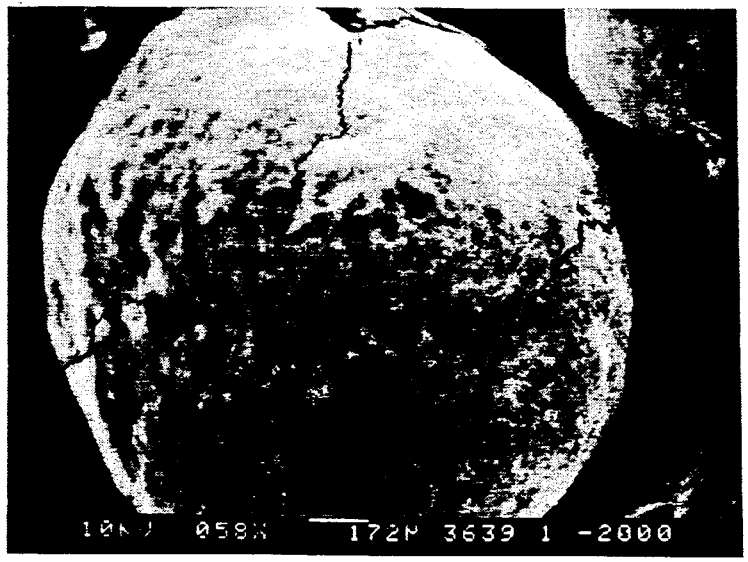
FIG. 3 is a photomicrograph of a carbonaceous granular heat insulator prepared in Run No 16 of a comparative example.

FIGS. 2 and 3 are photomicrographs (a magnification of 42) showing the granule structures of the carbonaceous granular heat insulators (a granule diameter of 1 to 2 mm) obtained in Run No. 9 (example of the present invention) and Run No. 16 (comparative example), respectively. As can be seen from FIGS. 2 and 3, the carbonaceous granular heat insulator in Run No. 9 has a true spherical shape, while the carbonaceous granular heat insulator in Run No. 16 is not only poor in the sphericity but also has cracks on the surface thereof.

EXAMPLE 4

A binder solution was added to carbon black pellets having various characteristics, followed by granulation. The binder solution was prepared by dissolving a phenolic resin (PR50001E; a product of Sumitomo Durez Co., Ltd.) or a furan resin (Hitafran VF303; a product of Hitachi Chemical Co., Ltd.) in ethanol or an ethanol/actone mixture (a volume ratio of 1 : 1) so as to have a predetermined binder concentration.

The secondary granulation granule thus obtained was heated in the air at 150° C. for 1 hr to volatilize and remove the solvent and, at the same time, to precure the resin component. Subsequently, the granule was cured in the air at 250° C. for 1 hr, followed by baking: and carbonization in a nitrogen gas atmosphere at 2000° C. for 30 min. The granule size distribution, strength characteristics, and thermal conductivity of the carbonaceous granular heat insulator thus obtained were determined in the same manner as that of Examples 1 and 3.

The results are shown in Table 3. For comparison, the carbon black which does not meet the requirements of the present invention was also treated in the same manner as that described above. The results are shown in Table 3.

EXAMPLE 5

The secondary granulation granules obtained in Run Nos. 17 and 19 of Example 4 were heat cured in a rotary drum (a number of revolutions of 30 rpm, a temperature of 200° C. and a treating time of 2 hr) and then baked and carbonized in a nitrogen atmosphere at 2000° C. for 30 min. The strength characteristics and thermal conductivity of the carbonaceous granular heat insulators are shown in Table 4. The granules prepared according to the above-mentioned method had a sphericity superior to that obtained in Example 4.

TABLE 2

| Run No. | Base material | Examples of present invention ||||||
|---|---|---|---|---|---|---|---|
| | | 8 | 9 | 10 | 11 | 12 | 13 |
| <Conditions of step 2> | | | | | | | |
| Temperature elevation rate (°C./min) | — | 5 | 5 | 10 | 10 | 20 | 5 |
| Treating temperature (°C.) | — | 150 | 150 | 150 | 200 | 200 | 150 |
| Retention time (min) | — | 30 | 60 | 120 | 30 | 60 | 30 |
| Circumferential speed of rotation (m/sec) | — | 2 | 1 | 0.2 | 1 | 0.5 | 3 |
| <Characteristics of heat insulator> Granule size distribution (%) | | | | | | | |
| granule diameter: 1.0 to 2.0 mm | 45 | 40 | 42 | 45 | 40 | 42 | 39 |
| granule diameter: 0.5 to 1.0 mm | 33 | 52 | 50 | 52 | 51 | 50 | 51 |
| granule diameter: 0.25 to 0.5 mm | 13 | 6 | 7 | 3 | 6 | 6 | 8 |
| granule diameter: 0.149 to 0.25 mm | 5 | 2 | 1 | 0 | 3 | 2 | 3 |
| granule diameter: less than 0.149 mm | 4 | 0 | 0 | 0 | 0 | 0 | 0 |
| Pellet hardness (g/pellet) | — | 330 | 350 | 360 | 340 | 300 | 320 |
| Attrition ($\times 10^{-2}$ wt %) | — | 3 | 3 | 3 | 3 | 3 | 3 |
| Thermal conductivity (Kcal/m · hr. °C.) | | | | | | | |
| at 1200° C. | — | 0.415 | 0.400 | 0.410 | 0.390 | 0.370 | 0.420 |
| at 1500° C. | — | 0.460 | 0.455 | 0.475 | 0.440 | 0.410 | 0.460 |

| Run No. | Comparative examples |||
|---|---|---|---|
| | 14 | 15 | 16 |
| <Conditions of step 2> | | | |
| Temperature elevation rate (°C./min) | 5 | 28 | 25 |
| Treating temperature (°C.) | 150 | 150 | 250 |
| Retention time (min) | 15 | 120 | 60 |
| Circumferential speed of rotation (m/sec) | 2 | 0.1 | 1 |
| <Characteristics of heat insulator> Granule size distribution (%) | | | |
| granule diameter: 1.0 to 2.0 mm | 40 | 45 | 40 |
| granule diameter: 0.5 to 1.0 mm | 39 | 34 | 40 |
| granule diameter: 0.25 to 0.5 mm | 14.5 | 15 | 13 |
| granule diameter: 0.149 to 0.25 mm | 5 | 5 | 5 |
| granule diameter: less than 0.149 mm | 1.5 | 1 | 2 |

TABLE 2-continued

|  |  |  |  |
|---|---|---|---|
| Pellet hardness (g/pellet) | 200 | 310 | 250 |
| Attrition ($\times 10^{-2}$ wt %) | 8 | 3 | 5 |
| Thermal conductivity (Kcal/m · hr. °C.) |  |  |  |
| at 1200° C. | 0.490 | 0.410 | 0.530 |
| at 1500° C. | 0.540 | 0.450 | 0.590 |

TABLE 3

|  | Examples of the present invention |  |  |  | Comparative examples |  |
|---|---|---|---|---|---|---|
| Run No. | 17 | 18 | 19 | 20 | 21 | 22 |
| (1) Characteristics of carbon black pellet sample |  |  |  |  |  |  |
| DBP absorption number of compressed sample (ml/100 g) | 101 | 106 | 100 | 100 | 85 | 58 |
| Nitrogen adsorption specific surface area (m²/g) | 58 | 99 | 79 | 79 | 42 | 27 |
| True specific gravity-related value Δd | 0.0820 | 0.0827 | 0.1234 | 0.1234 | 0.1624 | 0.2238 |
| (2) Granulating conditions |  |  |  |  |  |  |
| Carbon black pellet (g) | 1000 | 1000 | 1000 | 1000 | 1000 | 1000 |
| Binder resin | phenol | phenol | phenol | furan | phenol | phenol |
| Binder concentration (wt %) | 13.7 | 20.9 | 24.0 | 24.0 | 28.3 | 34.5 |
| Amount of addition of binder (ml) | 2000 | 1200 | 1000 | 1000 | 800 | 600 |
| Solvent | ethanol | ethanol | ethanol | ethanol/acetone | ethanol | ethanol |
| (3) Characteristics of granular carbonaceous heat insulator |  |  |  |  |  |  |
| Pellet hardness (g/pellet) | 320 | 365 | 410 | 420 | 470 | 520 |
| Attrition ($\times 10^{-2}$ wt %) | 5 | 5 | 4 | 4 | 3 | 2 |
| Thermal conductivity (Kcal/m · hr. °C.) |  |  |  |  |  |  |
| at 1200° C. | 0.450 | 0.505 | 0.550 | 0.540 | 0.660 | 0.705 |
| at 1500° C. | 0.495 | 0.550 | 0.595 | 0.585 | 0.705 | 0.760 |

TABLE 4

|  | Run No. | |
|---|---|---|
|  | 23 | 24 |
| (1) Characteristics of carbon black pellet sample |  |  |
| DBP absorption number of compressed sample (ml/100 g) | 101 | 100 |
| Nitrogen adsorption specific surface area (m²/g) | 58 | 79 |
| True specific gravity-related value Δd | 0.0820 | 0.1234 |
| (2) Granulating conditions |  |  |
| Carbon black pellet (g) | 1000 | 1000 |
| Binder component | Phenol | Phenol |
| Binder concentration (wt %) | 13.7 | 24.0 |
| Amount of addition of binder (ml) | 2000 | 1000 |
| (3) Characteristics of granular carbonaceous heat insulator |  |  |
| Pellet hardness (g/pellet) | 360 | 440 |
| Attrition ($\times 10^{-2}$ wt %) | 4 | 3 |
| Thermal conductivity (Kcal/m · hr. °C.) |  |  |
| at 1200° C. | 0.455 | 0.560 |
| at 1500° C. | 0.505 | 0.600 |

We claim:

1. A granular carbonaceous heat insulator comprising a carbon black pellet, said pellet being produced by wet granulation or by dry granulation and the surface of said pellet being coated with a dense layer of carbon, produced by:

coating carbon black pellets having voids therein with a volatile organic solvent solution containing 5 to 40 wt. % of a binder consisting of a thermosetting resin, tar or pitch;

heating the carbon black pellets coated with the binder solution at a rate of 20° C./min or less to a temperature of about 200° C., while the pellets are being tumbled in an inert gas stream, to remove the volatile organic solvent, and maintaining the pellets at about 200° C. for 30 min or longer to cure the binder; and p1 baking the carbon black pellets coated with the cured binder in a non-oxidizing atmosphere to carbonize the cured binder, said backed pellet having a pellet hardness of 100 g/pellet or more.

2. A carbonaceous heat insulator comprising a carbon black pellet, the surface of which is coated with a dense layer of carbon, produced by;

subjecting carbon black pellets made of carbon black to wet granulation in the presence of a volatile organic solvent solution of a binder consisting of a thermosetting resin, tar or pitch, said carbon black pellets having a DBP absorption number of 80 ml/100 g or more, a nitrogen adsorption specific surface area of 35 m²/g or more, and a true specific gravity-related value (Δd) of 0.150 as defined by the following equation, $\Delta d = d_2 - d_1$, wherein $d_1$ and $d_2$ are true specific gravity values of material carbon black after heat treatment of 650° C. and 2600° C., respectively;

heat treating the granulated carbon black pellets to remove the volatile organic solvent and to cure the binder; and baking the carbon black pellets coated with the cured binder in a non-oxidizing atmosphere to carbonize the cured binder, said baked pellet having a pellet hardness of 100 g/pellet or more.

* * * * *